US006608286B2

(12) United States Patent
Jiang

(10) Patent No.: US 6,608,286 B2
(45) Date of Patent: Aug. 19, 2003

(54) VERSATILE CONTINUOUS WELDING ELECTRODE FOR SHORT CIRCUIT WELDING

(76) Inventor: Qi Fen Jiang, 75 Springbrook Drive, Richmond Hill, Ontario (CA), L4B 3R3

( * ) Notice: Subject to any disclaimer, the term of this patent is extended or adjusted under 35 U.S.C. 154(b) by 52 days.

(21) Appl. No.: 09/967,703

(22) Filed: Oct. 1, 2001

(65) Prior Publication Data

US 2003/0062356 A1 Apr. 3, 2003

(51) Int. Cl.[7] ............................................. B23K 35/102
(52) U.S. Cl. .............................. 219/145.31; 219/145.23
(58) Field of Search ....................... 219/145.31, 145.23, 219/145.1, 136, 137 R

(56) References Cited

U.S. PATENT DOCUMENTS 5,432,997 A * 7/1995 Ni .............................. 29/825
5,488,217 A * 1/1996 Ni ......................... 219/137.31
5,575,933 A * 11/1996 Ni ......................... 219/145.31
5,603,855 A * 2/1997 Ni ......................... 219/137.31
5,618,451 A * 4/1997 Ni ......................... 219/121.53

* cited by examiner

*Primary Examiner*—M. Alexandra Elve
(74) *Attorney, Agent, or Firm*—David W. Wong

(57) ABSTRACT

A continuous welding electrode suitable for short circuit welding is provided. The electrode has a continuous metal core with a welding flux material coated on its entire outer surface and circumscribing gaps are formed at regular interval over its entire length to expose a portion of the metal core. The gaps are adaptable for applying the welding current to the electrode in the welding operation. The melting temperature of the welding flux material is about 0.8 to 0.9 times the melting temperature of the metal core; and the unit weight of the welding flux material coating is about 0.37 to 0.48 times the unit weight of the metal core.

2 Claims, 1 Drawing Sheet

VERSATILE CONTINUOUS WELDING ELECTRODE FOR SHORT CIRCUIT WELDING

FIELD OF INVENTION

This invention relates to high current welding electrodes and more particularly relates to a versatile continuous welding electrode which is usable for short circuit welding a work piece located in any position.

BACKGROUND OF INVENTION

An elongated continuous consumable welding electrode is used in electrical arc welding. The consumable welding electrode consists of a continuous metal core having a welding flux material coated on its outer surface; and circumscribing gaps are formed on the flux coating at regular intervals to expose the metal core such that high welding current may be provided to the electrode through these exposed gaps for the welding operation without any resistance loss of the welding current. In an electric arc welding operation, a welding current density of about 20 amperes per square millimeters is used to provide an electric arc when the tip of the electrode is placed at a close proximity to the weld area of the work piece. The electric arc causes the weld area of the work piece, the metal core as well as the welding flux to melt; and the slag of melted mixture of the metal core and flux is ejected onto the weld area. The slag subsequently solidifies to form the weld metal at the weld area. In order to prevent the melted mixture of metal core and flux material from ejecting outside of the weld area, an insert gas or a physical shield is commonly provided around the weld area. The shield prevents the ejecting mixture from depositing outside of the weld area. Such shielding arrangement increases the complexity of the welding gun and renders it difficult to operate. Furthermore, it is difficult and sometimes impossible to carry out welding on a work piece which is located in a vertical position or in an overhead position due to that the ejecting molten welding mixture would fall away from the work piece due to gravity.

Another problem in using the consumable continuous welding electrode with a welding gun is that the welding operation may be disrupted when the distance between the current application gap and the tip of the electrode is less than a certain length, typically less than 2.6 cm. Under this condition, a short circuit would occur to cause the termination of the welding arc and thus the abrupt termination of the welding operation.

The present invention provides a continuous welding electrode which facilitates continuous welding operation under short circuit condition. The welding operation may be carried out without shielding and with the direct contact of the welding tip to the work piece. The welding slag is formed directly on the weld area. Thus, welding may be carried out on a work piece which is located in any position including in the vertical position or at a directly overhead position. Furthermore, the welding material would penetrate deeply into the joint at the weld area of the work piece to provide an extremely strong bond. The electrode is suitable for use with a continuous welding gun such that shown in U.S. Pat. No. 5,603,855 to Chong Yang Ni.

SUMMARY OF THE INVENTION

It is a principal object of the present invention to provide a consumable continuous welding electrode which is suitable for short circuit welding operation.

It is another object of the present invention to provide a continuous welding electrode which facilitates welding without shield and the production of welding arc.

It is another object of the present invention to provide a continuous welding electrode is suitable for use with a continuous welding gun.

It is yet another object of the present invention to provide a continuous welding electrode which facilitates formation of welding slag penetrating deeply into the joint of the work piece.

DETAILED DESCRIPTION OF THE PREFERRED EMBODIMENTS

Figure 1:
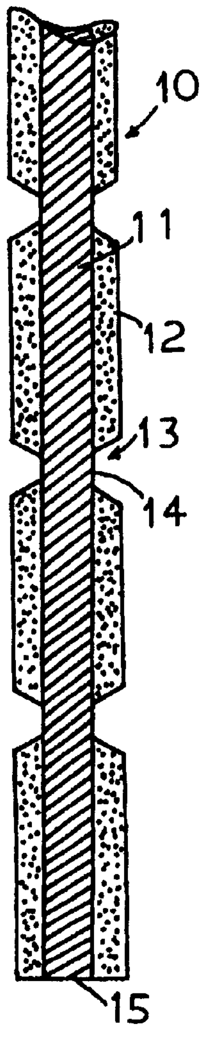
FIG. 1 is an isolated sectional side elevation view of a front portion of the continuous welding electrode according to the present invention.
Figure 2:
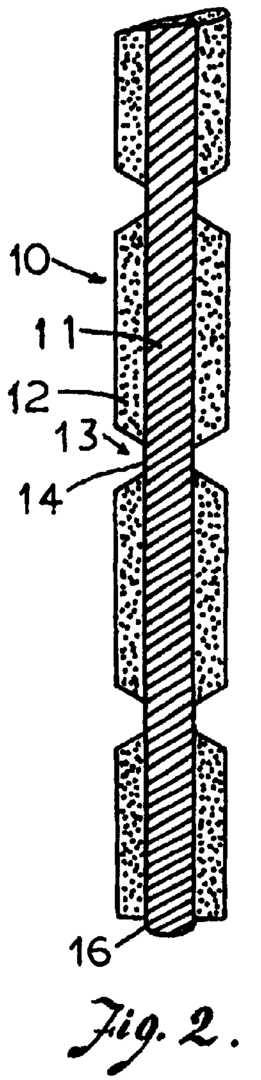
FIG. 2 is an isolated sectional side elevation view thereof during the welding operation.

With reference to the drawings in which like reference numerals designate corresponding corresponding parts in the two views, the welding electrode 10 of the present invention has a continuous metal core 11 coated on the surface with a welding flux material 12. Gaps 13 are formed at regular intervals in the welding flux material 12 to expose a portion of the metal core to provide welding current contact points 14 over the entire length of the electrode. Welding current may be applied to the electrode through a plurality of the current contact points 14 so as to minimize welding current loss due to the inherent resistance in the electrode.

In order for the welding electrode to operate in a short circuit condition, the metal core and the welding flux must melt at a rate at which only a portion of the metal core front tip 16 in the range of 0.3 to 3.0 mm will extend beyond the front end of the flux material coating 12 during the welding operation. If the length of the front tip 16 is longer than such critical length, air pockets would formed in the weld. On the other hand, if the length of the front tip 16 is less than the above critical length, ashes would formed in the slag. The existence of both air pockets and ashes would greatly reduce the strength and the desirable surface appearance of the weld.

The above critical requirements will be provided when the unit weights and the melting temperatures of the metal core and the flux material coating have the following relationship:

$$K_2=(0.8 \text{ to } 0.9)K_1 \text{ and } G_2=(0.37 \text{ to } 0.48)G_1$$

in which $K_1$ is the melting temperature of the metal core;

$K_2$ is the melting temperature of the flux material coating;

$G_1$ is the unit weight of the metal core; and $G_2$ is the unit weight of the flux material coating.

The welding electrode having the above properties will facilitate the formation of a front tip 16 in the range of 0.3 to 3.0 mm for the short circuit welding operation.

The welding electrode may be used with the linear welding gun as shown in U.S. Pat. No. 5,603,855 to Chong Yang Ni to carry out the desirable short circuit welding operation. The weld formed in such short circuit operation has a relatively smooth surface than that of conventional weld, and it penetrates deeply into the joint to form a strong bond. Furthermore, a continuous weld may be formed by tracing the front tip of the welding electrode along an elongated joint.

Obviously, numerous modifications and variations of the present invention are possible in light of the above teaching. It is therefore to be understood that within the scope of the appended claims, the invention may be practiced otherwise than as specifically described herein.

I claim:

1. A continuous welding electrode comprising, a continuous metal core having an outer coating of a welding flux material, a plurality of circumscribing gaps formed at regular intervals over the entire length of said electrode, said gaps exposing a circular surface of said metal core adaptable for applying welding current to said electrode for short circuit welding operation, said welding flux material and said metal core having melting temperatures and unit weights in the following relationships:

$$K_2=(0.8 \text{ to } 0.9)K_1 \text{ and}$$

$$G_2=(0.37 \text{ to } 0.48)G_1$$

wherein $K_1$ is the melting temperature of the metal core;

$K_2$ is the melting temperature of the flux material coating;

$G_1$ is the unit weight of the metal core; and $G_2$ is the unit weight of the flux material coating.

2. A continuous welding electrode according to claim 1 wherein said metal core has a front tip portion extending at a length in a range of 0.3 to 3.0 mm beyond a front edge portion of said outer coating of welding flux material in a short circuit welding operation.

* * * * *